United States Patent [19]
Nolan

[11] 3,824,541
[45] July 16, 1974

[54] ANTI-THEFT DEVICE FOR BICYCLES AND THE LIKE

[76] Inventor: Robert W. Nolan, 97 Madison Ave., Newtonville, Mass. 02160

[22] Filed: Nov. 15, 1972

[21] Appl. No.: 306,894

[52] U.S. Cl............ 340/65, 307/10 AT, 200/61.45
[51] Int. Cl. .......................................... G08b 13/00
[58] Field of Search ....... 340/52 H, 63, 64, 65, 280; 307/10 AT; 200/61.45, 61.52, 42

[56] References Cited
UNITED STATES PATENTS
| | | | |
|---|---|---|---|
| 3,673,562 | 6/1972 | Buell | 340/65 |
| 3,728,675 | 4/1973 | Horn | 340/52 H |

Primary Examiner—Alvin H. Waring
Attorney, Agent, or Firm—Morse, Altman, Oates & Bello

[57] ABSTRACT

An alarm device mountable to the frame of a bicycle or the like is adapted to emit a highly audible sound if the bicycle is removed from a parked position. The device includes a sound generating unit powered by batteries with a pair of angularly positioned mercury switches adapted to actuate the alarm through a latching relay circuit upon unauthorized movement of the bicycle. The components are contained in a housing attached to the bicycle frame and a key-operated lock switch is employed to arm the device when left in a parked position by the bicycle owner.

1 Claim, 3 Drawing Figures

PATENTED JUL 16 1974 3,824,541

ANTI-THEFT DEVICE FOR BICYCLES AND THE LIKE

BACKGROUND OF THE INVENTION

1. Field of the Invention

This invention relates generally to anti-theft alarms and more particularly is directed towards an anti-theft alarm device for use on bicycles or the like.

2. Description of the Prior Art

Bicycle thefts have increased at an alarming rate, particularly in urban and suburban areas. Even locked bicycles are subject to theft since most locks readily yield to bolt cutters commonly carried by thieves. If the bicycle wheel is locked against rotation, a thief may use a truck or the like to carry away the bike. Thefts of this nature are successful primarily for the reason that they can be carried out quickly and easily and with little or no noise.

Accordingly, it is an object of the present invention to provide a novel anti-theft alarm for bicycles and the like. Another object of this invention is to provide an alarm for bicycles and the like which will produce a highly audible signal upon unauthorized movement of a bicycle that has been left in a parked position.

SUMMARY OF THE INVENTION

This invention features an alarm device for bicycles and the like, comprising a housing mountable in a predetermined position to the bicycle frame, a sound generating unit mounted to said housing, battery means mounted in said housing connected to said sound generating unit and a control circuit including mercury switches and a relay adapted to complete a circuit between the battery and the sound generating unit upon unauthorized movement of the bicycle. A key-operated arming switch is provided to disable the circuit during normal use of the bicycle and to arm the circuit when it is parked.

DETAILED DESCRIPTION OF THE PREFERRED EMBODIMENT

Figures 1, 2, 3:
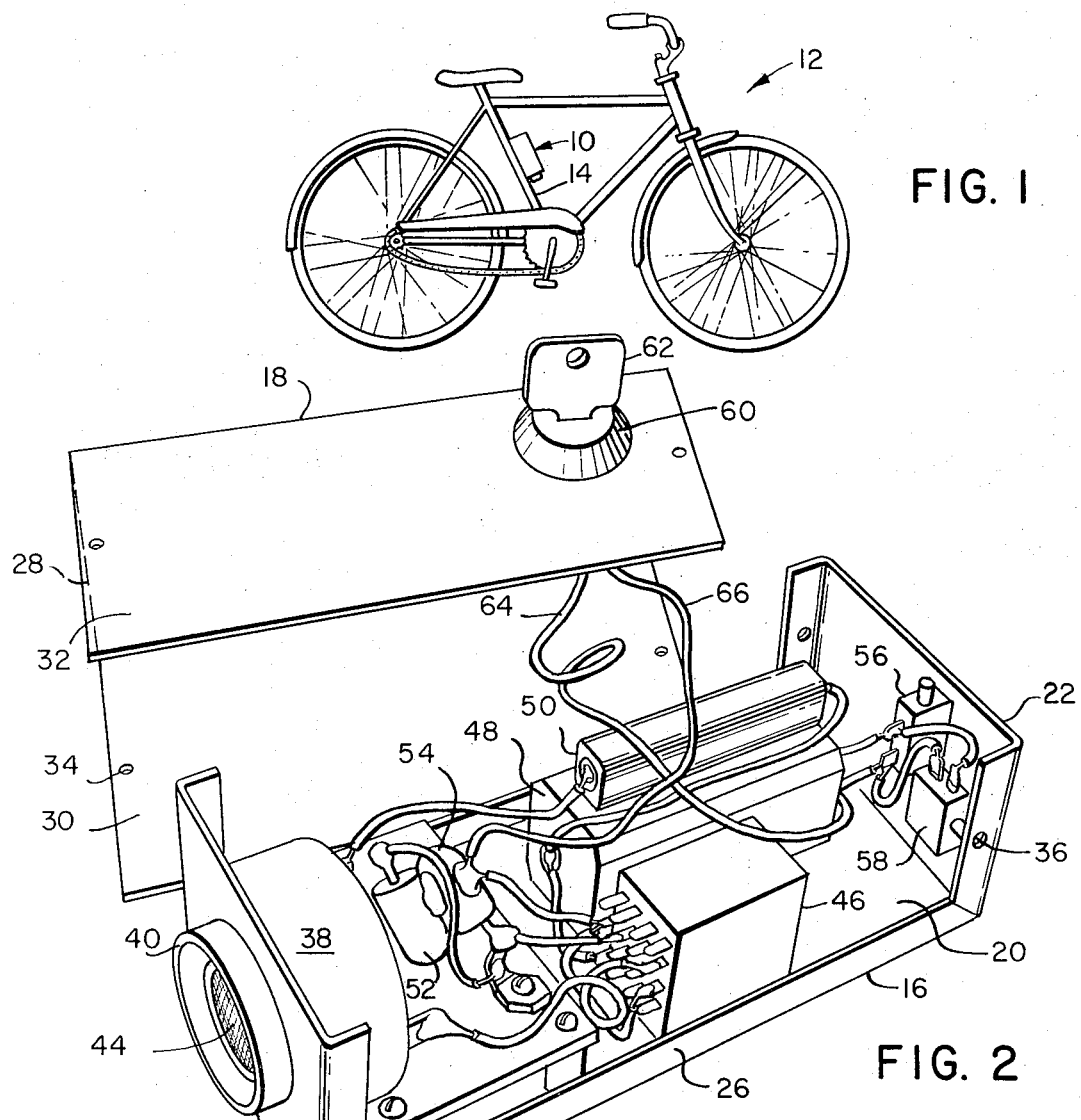
FIG. 1 is a view in side elevation of a bicycle equipped with an alarm device made according to the invention.
FIG. 2 is a view in perspective of an alarm device made according to the invention with the cover removed to show details of construction, and, FIG. 3 is a circuit diagram of the device.

Referring now to the drawings, the reference character 10 generally indicates an anti-theft alarm device mounted to a bicycle 12. Preferably, the device 10 is mounted to a generally vertical frame member 14 by means of one-way screws threaded into tapped holes formed in the front face of the frame member 14, from within the device.

The device is generally organized about a housing comprised of a chassis 16 and a cover 18 detachably connected thereto. In the illustrated embodiment, the chassis 16 is formed with a back wall 20, top and bottom walls 22 and 24 respectively and a marginal flange 26 extending along the edges thereof. The cover 18 is a U-shaped piece having a front wall 28 and rearwardly extending side walls 30 and 32. The assembled housing is of a boxed configuration and preferably is fabricated from steel, aluminum or other suitable material of sufficient strength and rigidity to provide a rugged, durable enclosure. The illustrated housing is assembled by screws threaded to screw holes 34 in the cover 18 in register with screw holes 36 in the flange 26 of the chassis 16.

Mounted to the chassis 16 is a sound-generating unit 38 such as a SONALERT SC 628 sold by the Mallory Corporation. Such units produce a piercing, high frequency sound that is high audible over a wide area. In the illustrated embodiment the sound-generating unit 38 is mounted to the bottom wall 24 of the chassis with its neck 40 extending through a circular opening 42 formed in the bottom wall. In practice, the mouth of the unit is covered with a fine mesh grid 44 to prevent disabling the unit by insertion of tool against an internal diaphragm.

Also, mounted in the chassis 16 is a relay 46, a pair of batteries 48 and 50, a pair of mercury switches 52 and 54 and a pair of microswitches 56 and 58. The switches, batteries, relay and sound generating unit are connected by appropriate leads to be described in connection with the description of the circuit diagram. The mercury switches 52 and 54 are mounted in such a manner as to provide motion sensitivity about two coordinate axes so that the alarm will be actuated should the bike be tilted forwardly, rearwardly or to either side once it has been armed. The microswitches 56 and 58 are mounted to the top wall 22 with the actuator of the microswitch 56 depressed by the front wall of the cover 18 when it is in position. Similarly, the actuator of the microswitch 58 is maintained depressed by a screw secured in the hole 36 formed in the flange of the chassis. The microswitches are of the normally closed type that are kept open by the housing cover as long as it is kept in place and the screws holding the cover to the chassis are in place. It will be understood that this arrangement prevents tampering of the unit.

Mounted in the side wall 32 of the cover 18, is a lock switch 60 operated by means of key 62 and connected by leads 64 and 66 to the batteries 48 and 50 and to the mercury switches 52 and 54. The function of the lock switch 60 is to permit the circuit to be armed when parked and disarmed when the bike is to be used by the owner. Thus, whenever the bike is being ridden in a normal fashion, the switch 60 is locked open but when the bike is parked and unattended the switch is locked closed by the operator and the key removed. With the switch 60 closed, the circuit is armed and will be actuated upon unauthorized movement of the bicycle.

Referring now to the circuit diagram of FIG. 3, it will be seen that the circuit includes a lead 68 connecting the sound generating unit 38 to the batteries 48 and 50 which are in series with the lock switch 60. The mercury switches 52 and 54 and the microswitches 56 and 58 are connected in parallel across the lead 66 and a lead 70 which is connected by lead 72 to the coil of the relay 46 and also connected to both contacts 74 and 76 of the relay. A lead 78 is connected from the relay contact 74 to the sound generating unit 38 and a lead 30 is connected to the opposite end of the relay coil and to a lead between the batteries 48 and 50.

The circuit functions in the following manner. Under normal operating conditions, the switch 60 is kept open whenever the bike is being ridden by the owner. Under this condition, the circuit is open to the sound generating unit 38 which cannot be actuated regardless of the condition of the other switches. However, when the owner parks his bike, he will close the switch 60 and remove the key 62. If the bike is parked in a substantially upright position, the mercury switches 52 and 54 will remain open and the microswitches 56 and 58 will also remain open as long as there is no tampering with the device. Under these conditions, the unit will not be actuated. However, assuming a thief should attempt to steal the bicycle, as soon as he tilts it one or both of the mercury switches 52 and 54 will close. If either of the mercury switches closes, this will complete a circuit from the batteries through the lead 64, the switch 60, the lead 66, through either or both mercury switches 52 and 54 and through the lead 70 to the coil of the relay 46. The opposite end of the coil is connected to the batteries through the lead 80. When the relay 46 is energized both contacts 74 and 76 will close thus completing a circuit to the sound generating unit 38 causing it to emit a highly audible alarm calling attention to the fact that the bike has been moved without authorization. This will either scare off the thief or at least warn the owner or others in the vicinity that the bike is being tampered with.

In addition to setting off the alarm, a latching circuit is closed so that the alarm will continue to sound even if the bike is returned to its original position. This latching circuit is provided by means of the relay contact 76 which is connected on one side by the lead 82 to the lead 66 and is connected on the other side by lead 84 to the lead 70. The lead 70 will be seen to be connected to the batteries through the relay coil to the lead 80, thereby maintaining continuous power to the relay so that the alarm will continue to sound.

In the event that the thief tampers with the alarm in an attempt to disable it, the alarm will be set off if the cover 18 is loosened or removed or if the screw opposite the microswitch 58 is loosened or removed. The switches 56 and 58 will close in either of those events and will initiate the same action as the closing of the mercury switches.

While the invention has been described with particular reference to the illustrated embodiment, numerous modifications thereto will appear to those skilled in the art. For example, housings other than those disclosed may be used to advantage and to further inhibit tampering of the circuit, the entire circuit components may be encapsulated in an appropriate potting material. Also, the mercury switches may be adjustably mounted so that the owner can select the degree of tilt needed to trigger the alarm.

Having thus described the invention what I claim and desire to obtain by Letters Patent of the United States is:

1. An alarm for bicycles and the like, comprising
   a. a housing mountable to said bicycle, said housing having a movable wall for access to said housing,
   b. an electric operated sound generator mounted to said housing,
   c. a first battery of relatively low voltage and a second battery of relatively high voltage connected in series to said generator,
   d. a key-operated lock switch connected in series to said batteries for selectively opening and closing a circuit to said batteries,
   e. at least a pair of independently adjustable mercury switches connected in parallel between said lock switch and said generator,
   f. at least one normally closed switch connected in parallel to said mercury switches and mounted in position within said housing adjacent said movable wall whereby said normally closed switch will be kept open as long as said wall is in the normal position,
   g. a relay connected between said sound generator and said mercury switches and said normally closed switch,
   h. said relay including a coil connected on one side to said first battery and on the other side to all of said mercury and normally closed switches and responsive to actuation of any one thereof,
   i. said relay also including first and second normally open switches, said first switch connected between said generator and said mercury and normally closed switches, said second switch being connected between said coil and said lock switch.

* * * * *